(12) United States Patent
Hathaway et al.

(10) Patent No.: US 10,197,176 B2
(45) Date of Patent: Feb. 5, 2019

(54) THERMALLY-CONTROLLED FLUID SUPPLY ASSEMBLY

(71) Applicant: MRA Systems, Inc., Baltimore, MD (US)

(72) Inventors: Samuel Robert Hathaway, Cincinnati, OH (US); John S. Mears, Cincinnati, OH (US)

(73) Assignee: MRA Systems, Inc., Baltimore, MD (US)

( * ) Notice: Subject to any disclaimer, the term of this patent is extended or adjusted under 35 U.S.C. 154(b) by 0 days.

(21) Appl. No.: 15/520,724

(22) PCT Filed: Oct. 20, 2014

(86) PCT No.: PCT/US2014/061286
§ 371 (c)(1),
(2) Date: Apr. 20, 2017

(87) PCT Pub. No.: WO2016/064370
PCT Pub. Date: Apr. 28, 2016

(65) Prior Publication Data
US 2017/0314695 A1 Nov. 2, 2017

(51) Int. Cl.
*F16K 17/38* (2006.01)
*F16K 31/00* (2006.01)
(52) U.S. Cl.
CPC .......... *F16K 17/383* (2013.01); *F16K 31/002* (2013.01)
(58) Field of Classification Search
CPC ................ F16K 17/383; F16K 31/002; Y10T 137/1624; Y10T 137/1632; Y10T 137/1639; Y10T 137/1797; Y10T 137/1812; Y10T 137/1819; Y10T 137/1782
USPC ................... 137/68.11, 68.12, 72, 74, 75, 70
See application file for complete search history.

(56) References Cited

U.S. PATENT DOCUMENTS

| 466,022 | A | * | 12/1891 | Rice | F16K 17/383 |
| | | | | | 137/75 |
| 800,740 | A | * | 10/1905 | Welzin | F16K 17/383 |
| | | | | | 137/75 |
| 973,260 | A | * | 10/1910 | Creighton | F16K 17/383 |
| | | | | | 137/75 |
| 1,938,967 | A | * | 12/1933 | Lovekin | F16K 17/383 |
| | | | | | 137/75 |
| 3,730,205 | A | * | 5/1973 | Guimbellot | F16K 17/383 |
| | | | | | 137/73 |

(Continued)

FOREIGN PATENT DOCUMENTS

DE           39 32 900 A1     2/1991

OTHER PUBLICATIONS

International Search Report and Written Opinion issued in connection with corresponding PCT Application No. PCT/US2014/061286 dated Jul. 8, 2015.

(Continued)

*Primary Examiner* — Minh Le
(74) *Attorney, Agent, or Firm* — MRA Systems, Inc.; William Andes

(57) ABSTRACT

A fluid supply assembly having a conduit through which a fluid may be supplied. A thermal shut-off may be provided to control the supply of fluid through the conduit in response to an environmental temperature condition.

17 Claims, 6 Drawing Sheets

(56) References Cited

U.S. PATENT DOCUMENTS

| | | | | |
|---|---|---|---|---|
| 3,862,641 | A | * | 1/1975 | Follett .................... F16K 17/28 137/519 |
| 4,488,566 | A | * | 12/1984 | Hicks .................... F16K 17/383 137/515.7 |
| 4,562,853 | A | * | 1/1986 | Tschirky ................ E21B 21/10 137/457 |
| 4,887,631 | A | * | 12/1989 | Friend .................... A62C 2/06 137/74 |
| 4,932,431 | A | * | 6/1990 | Silagy .................... F16L 37/23 137/174 |
| 5,027,845 | A | * | 7/1991 | Silagy .................... F16L 37/23 137/74 |
| 5,472,008 | A | * | 12/1995 | Boarin .................... F16K 17/30 137/517 |
| 5,477,877 | A | * | 12/1995 | Schulze .................. A62C 4/02 137/457 |
| 5,542,445 | A | * | 8/1996 | Adams .................... F16K 17/36 137/68.12 |
| 6,125,872 | A | | 10/2000 | Cunkelman et al. |
| 7,225,830 | B1 | * | 6/2007 | Kershaw ................ F16K 17/06 137/512.1 |
| 2003/0010379 | A1 | | 1/2003 | Kleiner et al. |
| 2008/0289695 | A1 | * | 11/2008 | Holzer .................. F16K 17/383 137/73 |

OTHER PUBLICATIONS

International Preliminary Report on Patentability issued in connection with corresponding PCT Application No. PCT/US2014/061286 dated Apr. 25, 2017.

* cited by examiner

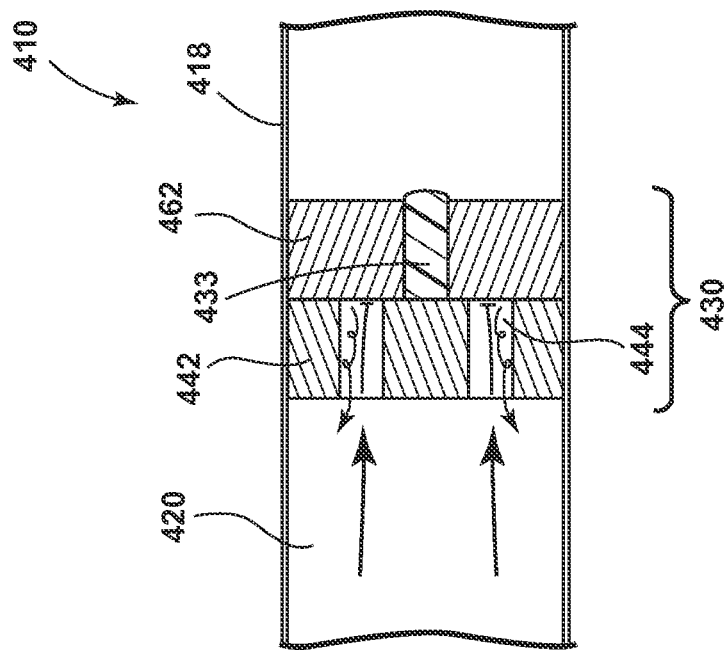
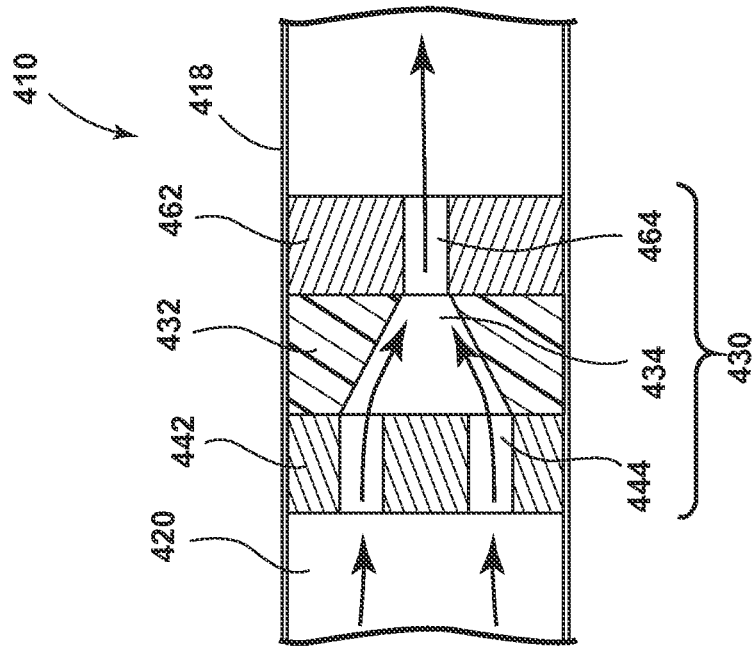

THERMALLY-CONTROLLED FLUID SUPPLY ASSEMBLY

BACKGROUND OF THE INVENTION

Fluid supply assemblies may be used in a variety of applications, with each application typically being designed for the supply of a particular fluid. In some cases, to not supply a fluid during certain adverse thermal conditions. If the supplied fluid is combustible or has a deleterious effect when exposed to heat, it may be desirable to stop the supply of the fluid when the adverse thermal condition is determined. For example, when the fluid supply assembly experiences a thermal event, a shut off of fluid flow may be desired. Some illustrative examples of fluid shut off include sealing all internal and external leak paths separately or utilizing a shut-off valve upstream of the component.

BRIEF DESCRIPTION OF THE INVENTION

An embodiment of the invention relates to a fluid supply assembly which may experience a thermal event. The fluid flow must be rapidly shutoff within the component when this event occurs. In one embodiment, a fluid supply assembly is disclosed comprising a fluid conduit defining a fluid passage, a thermal shutoff located within the fluid passage and operable between an open state, where fluid may flow through the fluid passage, and a closed state, where fluid is prevented from flowing through the fluid passage; wherein the thermal shutoff moves from the open state to the closed state in response to a predetermined thermal condition.

In an alternate embodiment, a fluid supply assembly is disclosed comprising a fluid manifold defining a manifold fluid passage; a fluid fitting coupled to the manifold and defining a fitting fluid passage in communication with the manifold fluid passage to define an assembly fluid passage; a valve seat located within the assembly fluid passage; a valve body having at least one through passage and located within the assembly fluid passage and movable relative to the valve seat; and a thermal fuse located within the assembly passage and between the valve seat and the valve body and configured to melt at a predetermined temperature; wherein the thermal fuse melts, the valve body abuts the valve seat to close off the through passage and block fluid flow through the assembly fluid passage.

BRIEF DESCRIPTION OF THE DRAWINGS

In the drawings:

FIG. 9 is a sectional view of a fifth embodiment of a fluid supply assembly in an open state.

FIG. 10 is a sectional view of the fifth embodiment of the fluid supply assembly in a closed state.

DETAILED DESCRIPTION OF THE INVENTION

Figure 1:
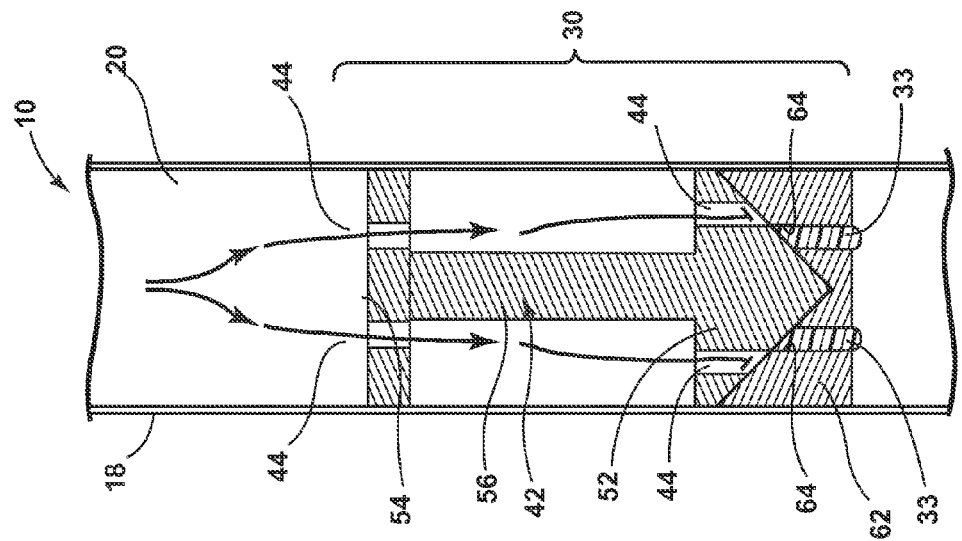
FIG. 1 is sectional view of a first embodiment of a fluid supply assembly in an open state.

FIG. 1 illustrates a first embodiment of a fluid supply assembly 10 comprising a fluid conduit, one example of which is illustrated as a straight conduit 18, defining a fluid passage 20. A thermal shutoff 30 is provided within the fluid passage 20 and controls the flow of fluid through the fluid passage 20 in response to a thermal condition, such as an environmental thermal condition exterior of the fluid supply assembly 10.

The thermal shutoff 30 further comprises a valve body 42, thermal fuse 32, and valve seat 62. The valve body 42, thermal fuse 32, and valve seat 62 each have openings 44, 34 and 64, respectively, which are fluidly coupled to allow the flow of fluid there between. The valve body 42 is spaced from the valve seat 62 in the open state and abutting the valve seat 62 in the closed state to control the flow of fluid through the fluid passage 20. Gravity and fluid pressure are inherent to the system and may, depending on the configuration, act a biasing device 80, together or independent, in order to apply force to the thermal shutoff 30.

The valve body 42 is illustrated comprising a piston 52, head 54 and shaft 56. The outer profile of the piston head 54 is configured in size and shape to be commensurate with the size and shape of the passage 20 to allow a movable seal within the passage 20 wherein the head 54 prevents fluid from flowing along the circumference of the passage 20 yet the head 54 is movable within the passage 20 as the fluid pressure urges the valve body 42 in a downward motion. The piston head 54 has one or more openings 44 through which fluid may flow. The openings 44 are illustrated as cylindrical through-holes although in alternate embodiments said openings 44 may be cuboid, triangular prism, pentagonal prism or hexagonal prism, etc., in shape. Alternately, the piston head 54 may be a wheel shape with spokes or any other design that allows sufficient flow to pass through and apply pressure on the piston head 54 from said fluid at the same time. The piston shaft 56 is illustrated as cylindrical although it could be cuboid or other shapes in alternate embodiments. The piston 52 is illustrated as conical although it can be any shape that will seal with at least a portion of the valve seat 62. In most cases, the piston 52 has a portion 46 that is confronting to a corresponding complementary portion 66 of the valve seat 62 to effect the sealing when the two portions abut.

As illustrated, the piston 52 has a confronting surface 46 which forms the cone shape and abuts the complementary surface 66 of the valve seat 62 when the apparatus is in a closed state. The number of openings 44 in the piston 52 is dependent on the required fluid flow rate through the piston 52 and into the fuse 32 and seat 62. The valve body 42, in this exemplary embodiment, is made out of corrosion resistant steel but in alternate embodiments it may be made out of other metals such as aluminium or titanium or any material with a melting temperature significantly higher than that of the thermal fuse 32 material. The type of material is not germane to embodiments of the invention.

As illustrated, the thermal fuse 32 is ring-shaped, made of nylon and located between the valve body 42 and valve seat 62. Any suitable shape may be used. For purposes of an embodiment of the invention, the thermal fuse 32 functions to release the valve body 42 so that it can seal against the valve seat. The thermal fuse 32 may be made of any thermoplastic material such as acrylic, polybenzimidazole, polyethylene, polypropylene, polystyrene, polyvinyl chloride, etc.

The term "melt" as described herein is defined as to become molten, pliable or flowable enough to fill an opening when a force is applied, but not necessarily to the point where it becomes liquid and would therefore be removed completely from the fluid passage 20 by the fluid flow. While melt need not include the material becoming a liquid, it is within the scope of embodiments of the invention for the material to become liquid.

The valve seat 62 is illustrated as a cylinder with a conical shaped complementary surface 66. The number of openings 64 in the valve seat 62 is dependent on the required fluid flow rate into the passage 20 below the seat 62. The valve seat 62, in this exemplary embodiment, is made out of corrosion resistant steel but in alternate embodiments it may be made out of other metals such as aluminium or titanium or any material with a melting temperature significantly higher than that of the thermal fuse 32 material. The valve seat 62 is fixed within the fluid passage 20 via a water-tight bond such as welding, adhesive, sealant, etc.

The fluid may be any type of fluid, in either a gas or liquid phase, including both phases. In the contemplated environment, the fluid is likely to be a fire resistant fluid, e.g. phosphate ester hydraulic fluid. In alternate embodiments the fluid may be water, oil, gasoline, water-glycol hydraulic fluid, petroleum based hydraulic fluid, hydrocarbon hydraulic fluid, non-conductive hydraulic fluid, glycol, esters, polyalphaolefin, propylene glycol, butanol or silicone oils. The fluid may be synthetic or mineral based. The fluids listed are exemplary and is not limited to the above described fluids.

Figure 2:
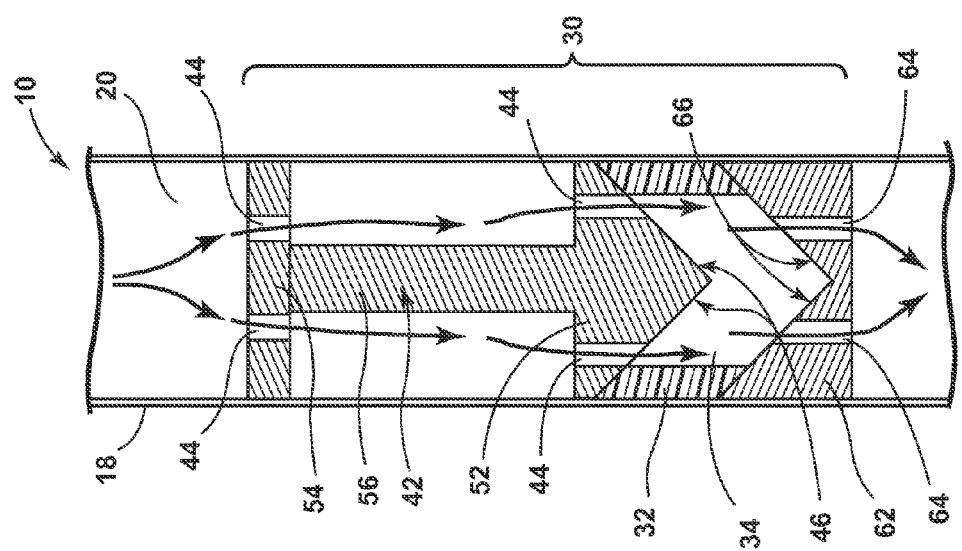
FIG. 2 is a sectional view of the first embodiment of the fluid supply assembly in a closed state.

FIG. 2 illustrates the first embodiment in a closed state. Melted thermal fuse 33 is shown after a thermal event wherein the temperature experienced by the thermal fuse 33 is sufficient to cause the thermal fuse to sufficiently change shape such that the thermal fuse 33 melts and enables the valve body 42 to abut the valve seat 62 thus shutting off the fluid flow in the passage 20. This change in shape of the fuse 32 to 33 occurs at a predetermined thermal condition and enables the thermal shutoff 30 to change from an open to a closed state. Said thermal condition is a predetermined temperature wherein the fuse 32 melts. The thermal fuse 32 will in an embodiment melt at a point between 500-600 degrees Fahrenheit. The melted thermal fuse 33 also acts as a seal in order to stop the fluid flow if the abutment of the valve body 42 and valve seat 62 is not sufficiently tight enough to stop the fluid flow.

Figure 3:
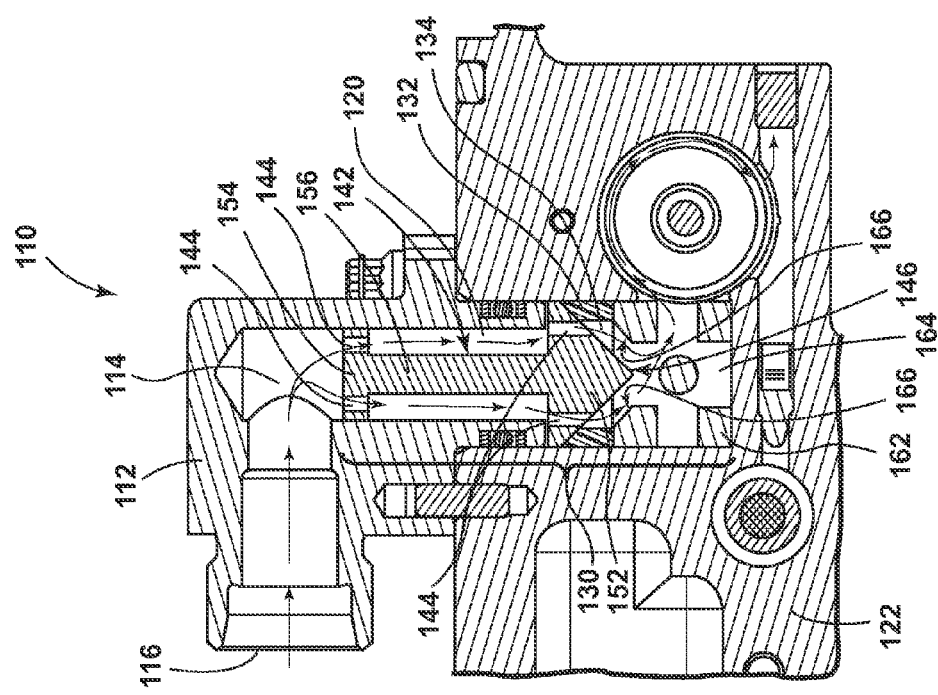
FIG. 3 is a sectional view of a second embodiment of a fluid supply assembly in an open state.

FIG. 3 illustrates a second embodiment of a fluid supply assembly 110 comprising a fluid conduit, which is illustrated as a fitting 112 fluidly connected to a manifold 122. The second embodiment is similar to the first embodiment, with the primary difference being the second embodiment is implemented in a fitting 112 and manifold 122 environment, instead of a straight conduit. For the most part, like parts between the two embodiments will be identified with like numerals, with the numerals of the second embodiment being increased by 100.

While the conduit is illustrated as a fitting 112 and manifold 122; other structures may be used including, but not limited to, a pipe, hose, tube, pump, valve, actuator, reservoir, accumulator, filter or any combination thereof.

The fluid fitting 112 defines a fluid passage 114 of a substantially cylindrical shape. The shape and size of fluid passage 114 is dependent upon the amount of fluid to be utilized and structure surrounding the area of the fluid supply assembly 110. The shape and size of opening 116 of the fluid fitting 112 is dependent on the coupling structure. The fluid passage 114 is illustrated with an elbow turn. In other embodiments, the passage 114 may be straight, curved, or angled. The fluid fitting 112 is steel but may be manufactured out of alternate metals, plastic or composite.

The manifold 122 is coupled to the fluid fitting 112. The manifold 122 further defines a fluid passage 124 which is likewise coupled to the fluid conduit passage 114 wherein fluid may flow from the fluid conduit passage 114 to the manifold passage 124. The manifold 122 is, in an embodiment, steel but may be manufactured out of alternate metals or composite. The valve seat 162 may be an integral part of the manifold 122 instead of a separate piece as shown. Assembly fluid passage 120 comprises fluid passages 114 and 124 and contains a thermal shutoff 130 there within. The thermal shutoff 130 is the same as aforementioned in FIG. 1.

Figure 4:
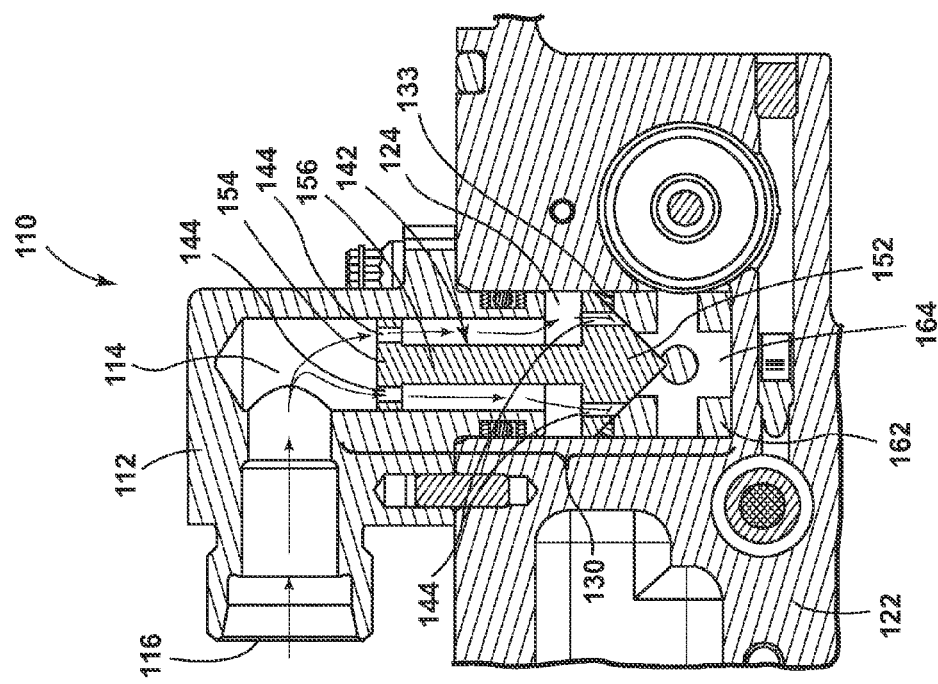
FIG. 4 is a sectional view of the second embodiment of the fluid supply assembly in a closed state.

FIG. 4 illustrates the second embodiment in a closed state. In the same manner as aforementioned in FIG. 2, the thermal shutoff 130 is shown after a high heat event with a melted thermal fuse 133. The thermal fuse 132 melts and enables the valve body 142 to abut the valve seat 162 thus shutting off the fluid flow in the passage 120. The melted thermal fuse 133 also acts as a seal in order to stop the fluid flow if the abutment of the valve body 142 and valve seat 162 is not sufficiently tight enough to stop the fluid flow.

Figure 5:
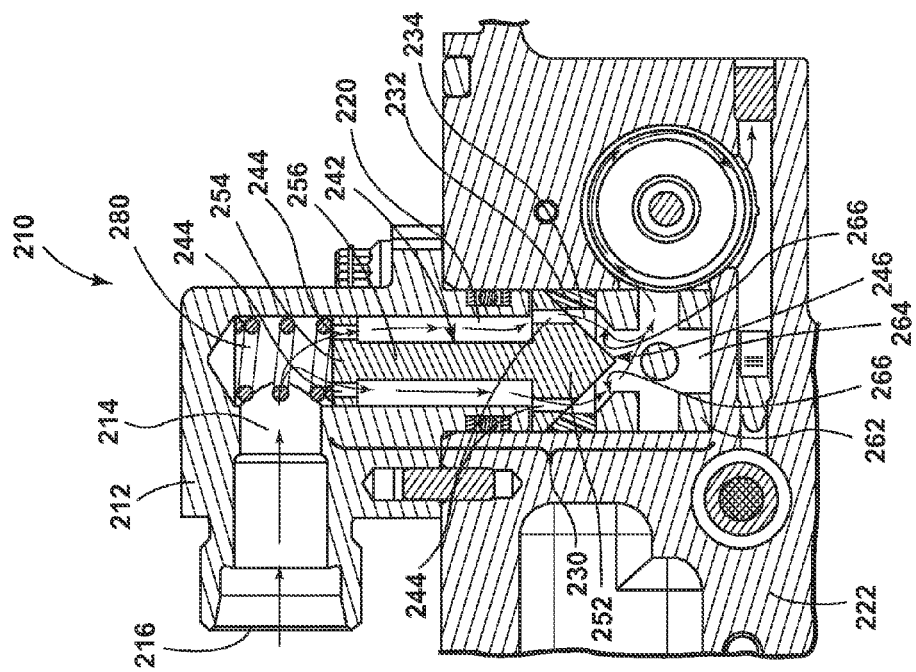
FIG. 5 is a sectional view of a third embodiment of a fluid supply assembly in an open state.

FIG. 5 illustrates a third embodiment of a fluid supply assembly 210. The third embodiment is similar to the second embodiment, with the primary difference being the third embodiment has a biasing device 280 which is disposed within the fluid passage 214. For the most part, like parts between the two embodiments will be identified with like numerals, with the numerals of the third embodiment being increased by 100.

The biasing device 280 urges the valve body 242 at the piston head 254, in order to apply pressure to the thermal shutoff 230, towards the valve seat 262. The biasing device 280 is shown as a spring and may be utilized to push or pull the valve seat dependent upon the design.

Figure 6:
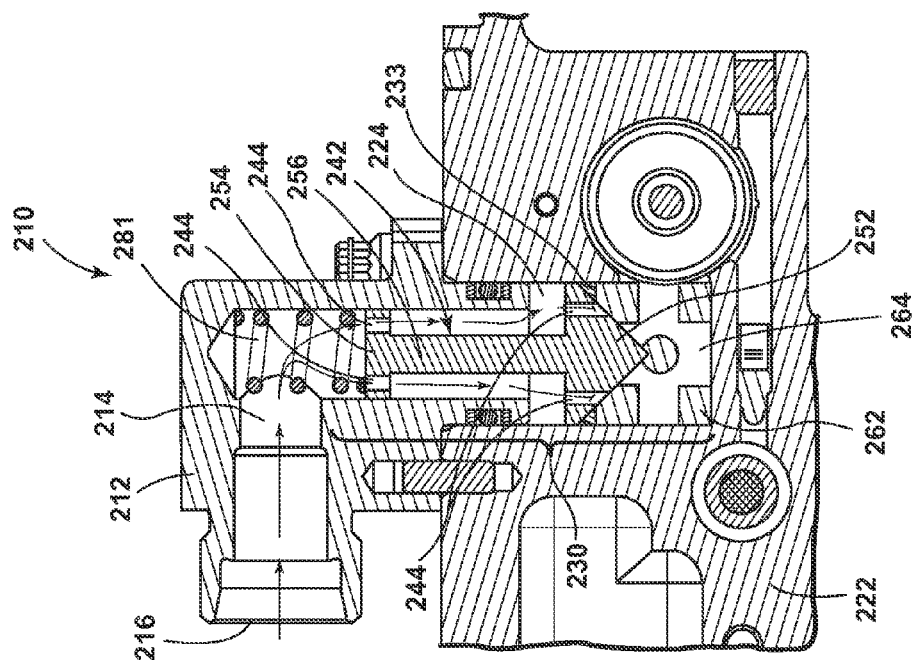
FIG. 6 is a sectional view of the third embodiment of the fluid supply assembly in a closed state.

FIG. 6 illustrates the third embodiment in a closed state. In the same manner as aforementioned in FIG. 2, the thermal shutoff 230 is shown after a thermal condition with a melted thermal fuse 233. The melted thermal fuse 233 also acts as a seal in order to stop the fluid flow if the abutment of the valve body 242 and valve seat 262 is not sufficiently tight enough to stop the fluid flow.

Figure 7:
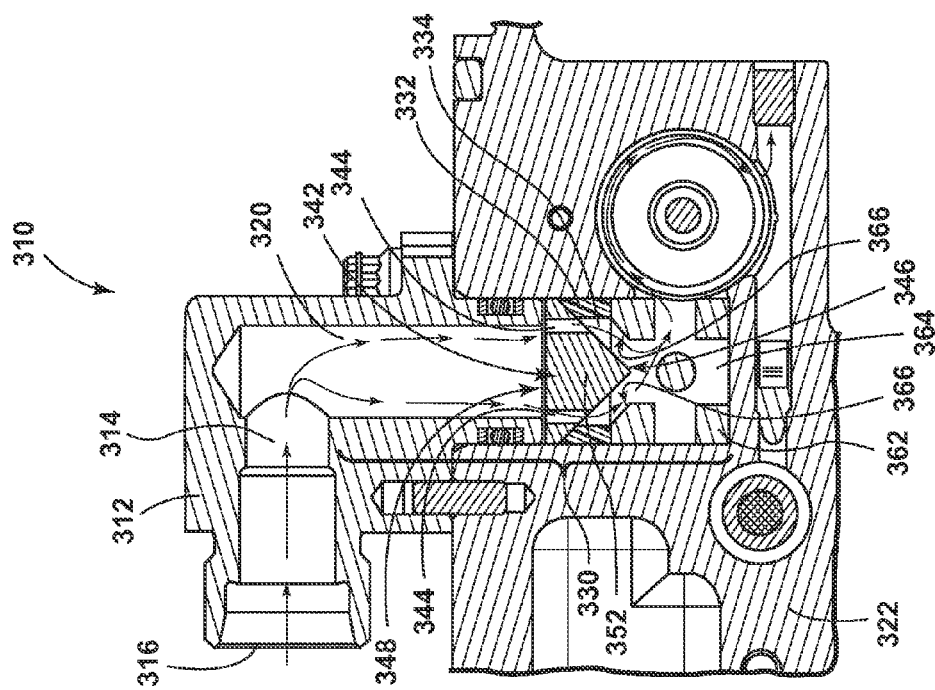
FIG. 7 is a sectional view of a forth embodiment of a fluid supply assembly in an open state.

FIG. 7 illustrates a forth embodiment of a fluid assembly 310. The forth embodiment is similar to the second embodiment, with the primary difference being that the fluid force is pushed against the flat surface 348 of the valve body 342 instead of the piston head 154. The flat surface 348 will allow the same force to be exerted on the valve body 342 as the piston head 154 does in FIG. 3. For the most part, like parts between the two embodiments will be identified with like numerals, with the numerals of the forth embodiment being increased by 200.

Figure 8:
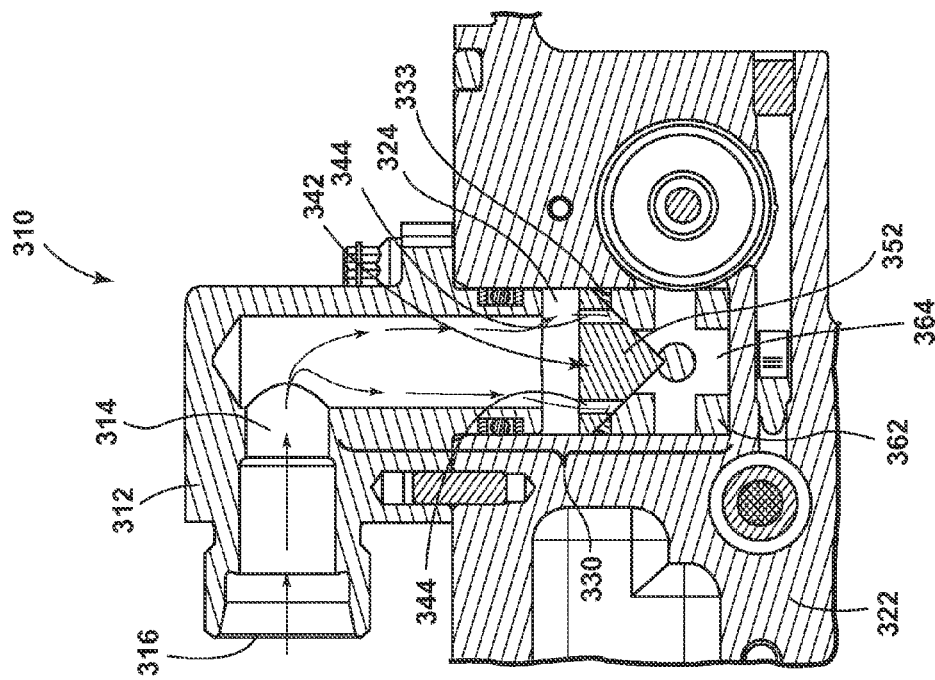
FIG. 8 is a sectional view of the forth embodiment of the fluid supply assembly in a closed state.

FIG. 8 illustrates the forth embodiment in a closed state. In the same manner as aforementioned in FIG. 2, the thermal shutoff 330 is shown after a thermal condition with a melted thermal fuse 333. The melted thermal fuse 333 also acts as a seal in order to stop the fluid flow if the abutment of the valve body 342 and valve seat 362 is not sufficiently tight enough to stop the fluid flow.

FIG. 9 illustrates a fifth embodiment of a fluid assembly 410. The fifth embodiment is similar to the first embodiment, with the primary difference being that the valve body 442, thermal fuse 432, and valve seat 462 are each substantially disk shaped with one or more though-holes 444, 434, and 464 respectively. For the most part, like parts between the two embodiments will be identified with like numerals, with the numerals of the fifth embodiment being increased by 400.

FIG. 10 illustrates the fifth embodiment in a closed state. In the same manner as aforementioned in FIG. 2, the thermal shutoff 430 is shown after a thermal condition with a melted thermal fuse 433. The melted thermal fuse 433 also acts as a seal in order to stop the fluid flow if the abutment of the valve body 442 and valve seat 462 is not sufficiently tight enough to stop the fluid flow.

Figure 11:
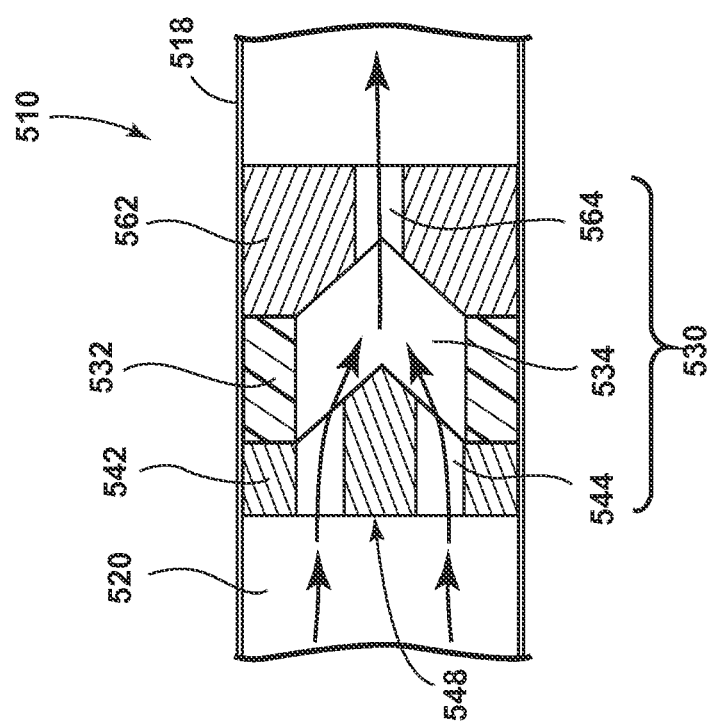
FIG. 11 is a sectional view of a sixth embodiment of a fluid supply assembly in an open state.

FIG. 11 illustrates a sixth embodiment of a fluid assembly 510. The sixth embodiment is similar to the first embodiment, with the primary difference being that the fluid force is pushed against the flat surface 548 of the valve body 542 instead of the piston head 54. For the most part, like parts between the two embodiments will be identified with like numerals, with the numerals of the sixth embodiment being increased by 500.

Figure 12:
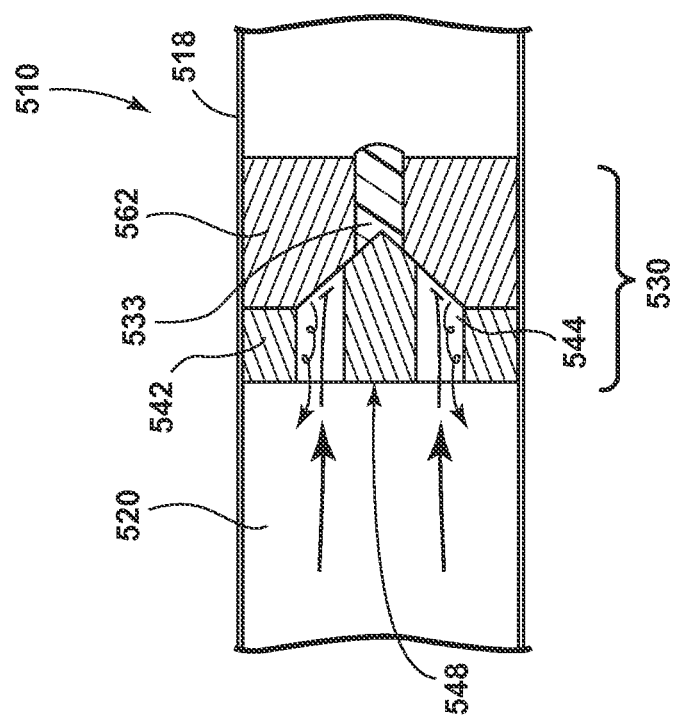
FIG. 12 is a sectional view of the sixth embodiment of the fluid supply assembly in a closed state.

FIG. 12 illustrates the sixth embodiment in a closed state. In the same manner as aforementioned in FIG. 2, the thermal shutoff 530 is shown after a thermal condition with a melted thermal fuse 533. The melted thermal fuse 533 also acts as a seal in order to stop the fluid flow if the abutment of the valve body 542 and valve seat 562 is not sufficiently tight enough to stop the fluid flow.

Referring back to FIG. 1, as the fluid travels through the passage 20 and through openings 44, which have a smaller volume than that of passage 20, pressure is built up and exerts a force on the piston head 54 thus urging the valve body 42 continually towards the valve seat 62. In this embodiment, the biasing element 80 is the fluid force or pressure.

The valve seat 62 is fixed to the passage 20 so as to not move relative to the passage 20 when fluid passes through or when the valve body 42 is urged against said seat 62. The valve body 42 and fuse 32 are free to move within the passage 20 and moveable relative to each other and the valve seat 62. The fuse 32 acts as a spacer between said body 42 and seat 62. Once a thermal condition occurs, the fuse 32 is melted and compressed into the openings 64 thus blocking the flow of fluid and acting as a shutoff within the apparatus. This mode of operation is generally the same for each embodiment shown.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Some exemplary embodiments have been described in the above. However, it should be understood that various modifications may be made thereto. For example, if the described techniques are carried out in different orders, and/or if the components in the described system, architecture, apparatus or circuit are combined in different ways and/or replaced or supplemented by additional components or equivalents thereof, proper results may still be achieved. Accordingly, other embodiments are also falling within the protection scope of the claims.

What is claimed is:

1. A fluid supply assembly comprising:
   a fluid conduit defining a fluid passage;
   a valve body located within the fluid passage and movable along the fluid passage, and having at least one opening; and
   a valve seat fixedly located within the fluid passage and configured to seat the valve body;
   wherein the valve body is configured to move from an open state, spaced from the valve seat, to a closed state, with the valve seat closing the at least one opening in the valve body, in response to a predetermined thermal condition.

2. The fluid supply assembly of claim 1 further comprising a thermal fuse which changes shape at the predetermined thermal condition to enable a change in state from the open state to the closed state.

3. The fluid supply assembly of claim 2 wherein the predetermined thermal condition is a predetermined temperature and the thermal fuse melts at the predetermined temperature.

4. A fluid supply assembly comprising:
   a fluid conduit defining a fluid passage;
   a valve body located within the fluid passage and movable along the fluid passage, and having at least one opening;
   a valve seat comprising a seat opening located within the fluid passage and configured to seat the valve body; and
   a thermal fuse configured to change shape at a predetermined thermal condition as a predetermined temperature where the thermal fuse melts at the predetermined temperature;
   wherein the valve body is configured to move from an open state, spaced from the valve seat, to a closed state, with the valve seat closing the at least one opening in the valve body, in response to the predetermined thermal condition.

5. The fluid supply assembly of claim 4 wherein the valve body and valve seat have confronting and complementary surfaces which contact each other when the valve body abuts the valve seat.

6. The fluid supply assembly of claim 4 wherein the valve seat is fixed within the fluid passage.

7. The fluid supply assembly of claim 4 further comprising a biasing device urging the valve body toward the valve seat.

8. The fluid supply assembly of claim 4 wherein the thermal fuse is located between the valve body and the valve seat.

9. The fluid supply assembly of claim 4 wherein the valve body comprises a piston having a head against which fluid in the fluid passage bears against to urge the valve body toward the valve seat.

10. The fluid supply assembly of claim 4 wherein the fluid conduit comprises a fluid line connected to a manifold.

11. The fluid supply assembly of claim 10 wherein the fluid line comprises a fluid fitting coupled to the manifold.

12. A fluid supply assembly comprising:
    a fluid manifold defining a manifold fluid passage;

a fluid fitting coupled to the fluid manifold and defining a fitting fluid passage in communication with the manifold fluid passage to define an assembly fluid passage;

a valve seat located within the assembly fluid passage;

a valve body having at least one through passage and located within the assembly fluid passage and movable along the assembly fluid passage; and a thermal fuse is positioned between and spaces the valve seat and the valve body and configured to melt at a predetermined temperature;

wherein when the thermal fuse melts, the valve body abuts the valve seat, with the valve seat sealing the at least one through passage in the valve body to block fluid flow through the assembly fluid passage.

13. The fluid supply assembly of claim 12 further comprising a biasing device urging the valve body into abutment with the valve seat.

14. A fluid supply assembly comprising:
a fluid conduit defining a fluid passage;
a valve body located within the fluid passage and movable along the fluid passage, with the valve body having at least one opening;
a valve seat located within the fluid passage, spaced from the valve body, and configured to seat the valve body and seal the at least one opening in the valve body when seating the valve body; and
a thermal fuse is positioned between and spaces the valve body and the valve seat, configured to melt in response to a predetermined thermal condition.

15. The fluid supply assembly of claim 14 wherein the valve seat seats the valve body when the thermal fuse melts in response to the predetermined thermal condition.

16. A fluid supply assembly comprising:
a fluid conduit defining a fluid passage;
a valve body located within the fluid passage and movable along the fluid passage, with the valve body having at least one opening;
a valve seat located within the fluid passage, spaced from the valve body, and configured to seat the valve body and seal the at least one opening in the valve body when seating the valve body; and
a thermal fuse extending between and spacing the valve body and the valve seat, configured to melt in response to a predetermined thermal condition;
wherein the valve seat further comprises a seat opening.

17. The fluid supply assembly of claim 16 wherein the valve body seals the seat opening when the valve seat seats the valve body.

* * * * *